United States Patent
Gellings et al.

(10) Patent No.: US 12,479,039 B2
(45) Date of Patent: Nov. 25, 2025

(54) SYSTEMS AND METHODS TO HAVE MULTIPLE WELDING-TYPE POWER SUPPLIES CONCURRENTLY SET UP

(71) Applicant: Illinois Tool Works Inc., Glenview, IL (US)

(72) Inventors: Beau Gellings, Appleton, WI (US);
Luke Brosco, Appleton, WI (US);
Manny Rumao, Appleton, WI (US);
Dan Helein, Appleton, WI (US);
Veronika Pashkina, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 13 days.

(21) Appl. No.: 18/523,050

(22) Filed: Nov. 29, 2023

(65) Prior Publication Data
US 2024/0181550 A1 Jun. 6, 2024

Related U.S. Application Data

(60) Provisional application No. 63/429,807, filed on Dec. 2, 2022.

(51) Int. Cl.
*B23K 9/10* (2006.01)
*H02J 3/00* (2006.01)

(52) U.S. Cl.
CPC .......... *B23K 9/1075* (2013.01); *H02J 3/007* (2020.01)

(58) Field of Classification Search
CPC .......... B23K 9/1075; B23K 9/32; H02J 3/007
USPC .......................................................... 307/52
See application file for complete search history.

(56) References Cited

U.S. PATENT DOCUMENTS

| | | | |
|---|---|---|---|
| 5,073,695 A | 12/1991 | Gilliland | |
| 2011/0198330 A1 | 8/2011 | Knoener | |
| 2011/0309054 A1* | 12/2011 | Salsich | B23K 9/091 |
| | | | 219/108 |
| 2014/0042809 A1* | 2/2014 | Lim | H02B 1/24 |
| | | | 307/23 |
| 2015/0028009 A1 | 1/2015 | Ide | |

FOREIGN PATENT DOCUMENTS

EP 3616822 3/2020

OTHER PUBLICATIONS

European Office Communication AppIn No. 23213489.0 with extended search report dated May 29, 2024.

* cited by examiner

*Primary Examiner* — Richard Tan
(74) *Attorney, Agent, or Firm* — McAndrews, Held & Malloy, Ltd.

(57) ABSTRACT

Example systems to enable multiple welding-type power supplies to be concurrently set up for operation on a same workpiece include: a work lead splitter configured to couple respective work lead terminals of the multiple welding-type power supplies to a same work clamp; and a power splitter configured to couple respective input power terminals of the multiple welding-type power supplies to a same source of input power.

13 Claims, 2 Drawing Sheets

SYSTEMS AND METHODS TO HAVE MULTIPLE WELDING-TYPE POWER SUPPLIES CONCURRENTLY SET UP

RELATED APPLICATIONS

The present application claims the benefit of U.S. Provisional Patent Application Ser. No. 63/429,807, filed Dec. 2, 2022, entitled "SYSTEMS AND METHODS TO HAVE MULTIPLE WELDING-TYPE POWER SUPPLIES CONCURRENTLY SET UP." The entirety of U.S. Provisional Patent Application Ser. No. 63/429,807 is expressly incorporated herein by reference.

FIELD OF THE DISCLOSURE

This disclosure relates generally to welding and, more particularly, to systems and methods to have multiple welding-type power supplies concurrently set up.

BACKGROUND

Some welding operators may possess and use multiple types of welding-type systems, such as for plasma cutting, different welding processes, wire preheating, and/or other processes. For operators who have not invested in electrical infrastructure that may be present in dedicated fabrication shops, changing between machines may involve undesirable and inefficient machine setup time, and may lead to less efficient and/or less productive practices.

SUMMARY

Systems and methods to have multiple welding-type power supplies concurrently set up are disclosed, substantially as illustrated by and described in connection with at least one of the figures, as set forth more completely in the claims.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
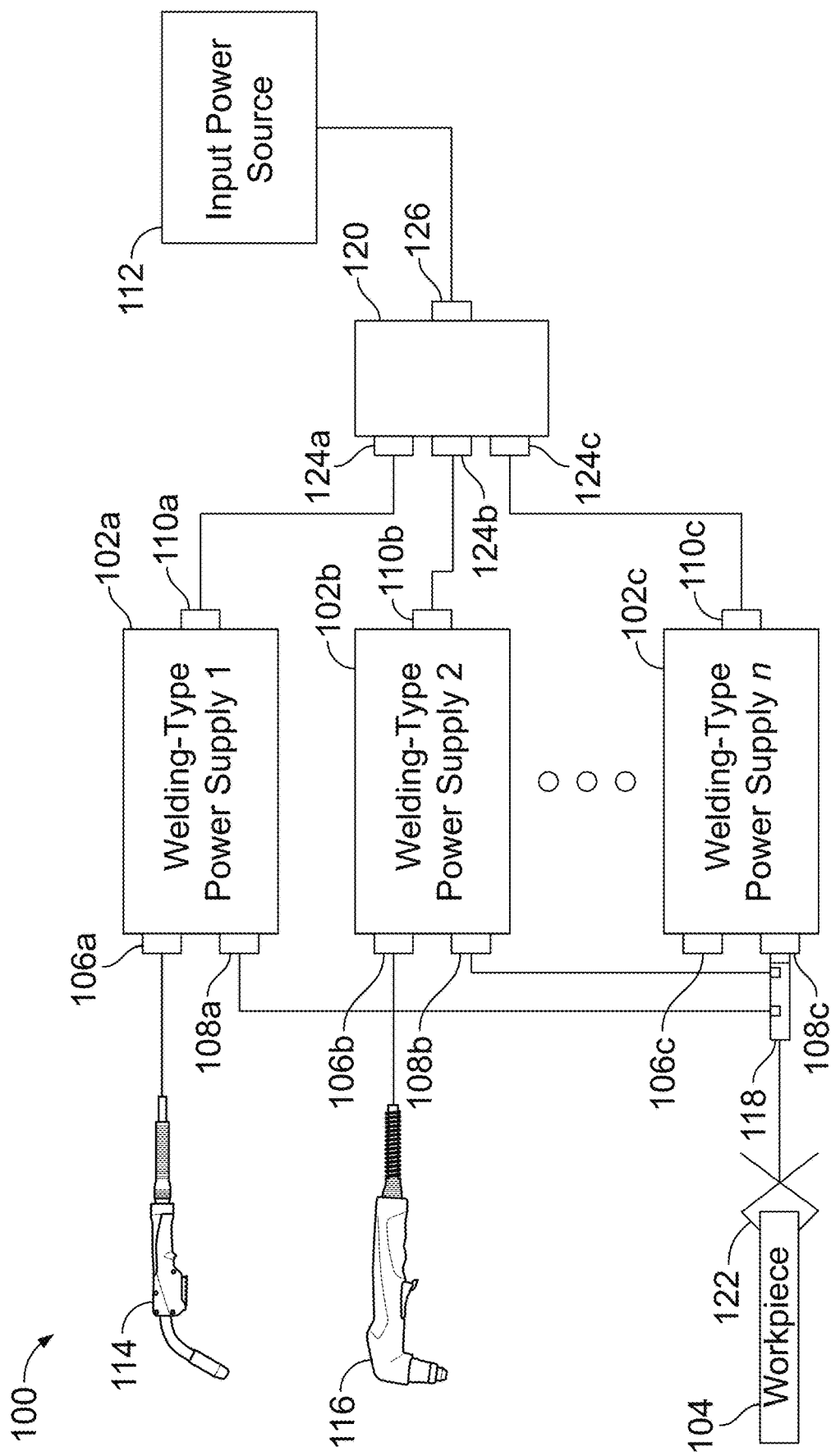
FIG. 1 illustrates an example arrangement including multiple welding-type power supplies concurrently set up, in accordance with aspects of this disclosure.

For the purpose of promoting an understanding of the principles of this disclosure, reference will be now made to the examples illustrated in the drawings and specific language will be used to describe the same. It will nevertheless be understood that no limitation of the scope of the claims is intended by this disclosure. Modifications in the illustrated examples and such further applications of the principles of this disclosure as illustrated therein are contemplated as would typically occur to one skilled in the art to which this disclosure relates.

As used herein, welding-type power refers to electrical power to perform one or more of welding, cladding, plasma cutting, induction heating, laser (including laser welding and laser cladding), carbon arc cutting, gouging, and/or resistive preheating. As used herein, a welding-type power source refers to any device capable of, when power is applied thereto, supplying welding, cladding, plasma cutting, induction heating, laser (including laser welding and laser cladding), carbon arc cutting or gouging and/or resistive preheating, including but not limited to transformer-rectifiers, inverters, converters, resonant power supplies, quasi-resonant power supplies, switch-mode power supplies, etc., as well as control circuitry and other ancillary circuitry associated therewith.

Disclosed examples enable weld operators to have multiple and/or different welding-type systems concurrently set up, which reduces the setup time involved in changing processes. In some disclosed examples, the outputs of multiple systems are connected to a workpiece using a single work clamp and/or work cable, and/or the inputs of the multiple systems are connected to a single source of input power via a single power cable. Disclosed example systems reduce the number of lengthy cords needed to operate multiple welding-type power supplies, and reduces or avoids the need to swap back and forth between a single extension cord while changing between processes involving different machines. Some disclosed examples further provide additional (e.g., non-welding) power connectors or outlets for use with ancillary equipment in a location that is more convenient to the work area.

Example systems enable multiple welding-type power supplies to be concurrently set up for operation on a same workpiece, and include: a work lead splitter configured to couple respective work lead terminals of the multiple welding-type power supplies to a same work clamp; and a power splitter configured to couple respective input power terminals of the multiple welding-type power supplies to a same source of input power.

In some example systems, the work lead splitter includes: a first work connector configured to be coupled to a first work lead terminal of a first one of the multiple welding-type power supplies; and a second work connector configured to be coupled to a second work lead terminal of a second one of the multiple welding-type power supplies. In some example systems, the work lead splitter further includes a third work connector configured to be coupled to the work cable, in which the third connector is electrically connected to the first work connector and the second work connector.

In some example systems, the work lead splitter further includes a work cable and a work clamp electrically connected to the first work connector and the second work connector. In some example systems, the first connector is configured to connect directly to the first work lead terminal, and the second connector is configured to connect to the second work lead terminal via a cable.

In some example systems, the power splitter includes: a first power connector configured to be coupled to a first input power terminal of a first one of the multiple welding-type power supplies; and a second power connector configured to be coupled to a second input power terminal of a second one of the multiple welding-type power supplies. In some example systems, the power splitter further includes a third power connector configured to be coupled to an input power cable to receive input power, the third power connector being electrically connected to the first power connector and the second power connector.

In some example systems, the power splitter further includes an input power cable configured to be coupled to an input power source, in which the input power cable is electrically connected to the first power connector and the second power connector. In some example systems, the power splitter includes a circuit breaker configured to disconnect at least one of the first power connector and the second power connector from a source of input power in response to an input current to the power splitter exceeding a threshold current. In some example systems, the power splitter further includes an indicator configured to provide at least one of an audio indication or a visual indication that the circuit breaker has disconnected at least one of the first power connector and the second power connector from the source of input power.

In some example systems, the power splitter includes interlock circuitry configured to prevent transmission of sufficient power to sustain a welding-type process to the second power connector while at least a threshold current is being transmitted via the first power connector. In some example systems, the interlock circuitry is configured to permit transmission of sufficient power to enable operation of a user interface of the second one of the multiple welding-type power supplies while at least the threshold current is being transmitted via the first power connector.

In some example systems, the multiple welding-type power supplies comprise two or more of a welding power supply, a plasma cutting power supply, or a wire preheating power supply.

FIG. 1 illustrates an example welding-type system 100 including multiple welding-type power supplies 102a-102c concurrently set up. The example welding-type system 100 of FIG. 1 is advantageously configured to enable rapid transitions between different types of welding-type processes. For example, an operator using the welding-type system 100 may quickly switch between welding and plasma cutting on the same workpiece 104 (e.g., without connecting and disconnecting input power connections or output power connections).

The welding-type power supplies 102a-102c may include welding power supplies, each supporting one or more types of welding processes (e.g., gas metal arc welding (GMAW), shielded metal arc welding (SMAW), gas tungsten arc welding (GTAW), flux cored arc welding (FCAW), submerged arc welding (SAW), etc.), plasma cutting power supplies, wire preheating power supplies, and/or any other types of power supplies. Each of the welding-type power supplies 102a-102c includes a first output terminal 106a-106c and a second output terminal 108a-108c. Depending on the specific process being used or output by the welding-type power supply 102a-102c, the electrical polarity of the first output terminal 106a-106c with respect to the second output terminal 108a-108c may differ.

Each of the example welding-type power supplies 102a-102c further includes an input power terminal 110a-110c, through which the welding-type power supplies 102a-102c receive input power from a same source of input power 112. The input power 112 may be main power, battery power, engine-driven generator power, and/or any other power source or combination of sources. In some examples, one or more of the welding-type power supplies 102a-102c are manually and/or automatically configurable to accept a range of voltages of input power. Examples of circuitry that allow the welding-type power supplies 102a-102c to use different input voltages are disclosed in U.S. Pat. No. 6,002,103. The entirety of U.S. Pat. No. 6,002,103 is incorporated herein by reference.

The example welding-type power supply 102a is a welding power supply which converts the input power to welding power, and outputs the welding power to a welding torch 114. The welding torch 114 may further receive welding wire, wire preheating power, shielding gas, coolant, and/or any other inputs, based on the specific welding process. The example welding-type power supply 102b is a plasma cutting power supply which converts the input power to cutting power, and outputs the cutting power to a plasma torch 116. The plasma torch 116 may further receive a supply of gas.

The welding-type power supplies 102a-102c are also coupled to the workpiece 104 to perform the respective processes. To change from using one process performed by one welding-type power supply to a second process performed using a second welding-type power supply, conventional welding-type power supplies required the operator to disconnect the first welding-type power supply from a source of input power and/or from the workpiece, and to connect the second welding-type power supply to the source of input power and/or to the workpiece. As a result, changing processes can be burdensome to an operator, and reduce productivity. To provide for concurrent setup of multiple welding-type power supplies 102a-102c, the example welding-type system 100 includes a work lead splitter 118 and a power splitter 120. As disclosed in more detail below, the example welding-type system 100 allows operators to transition more quickly and easily between processes involving different welding-type supplies.

Figure 2:
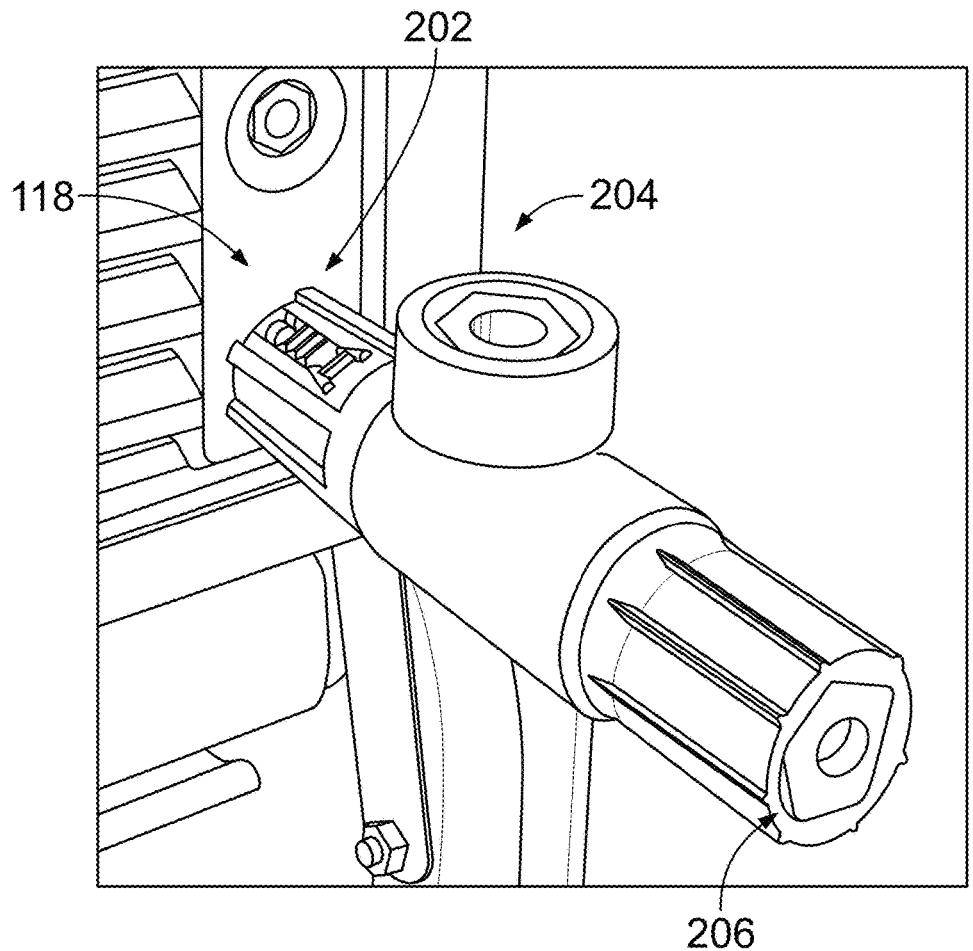
FIG. 2 illustrates an example implementation of the work lead splitter of FIG. 1.

The work lead splitter 118 couples the respective work lead terminals (e.g., the second output terminals 108a-108c) to a same work clamp 122, which is attached to the workpiece 104. FIG. 2 illustrates an example implementation of the work lead splitter 118 of FIG. 1. In the example of FIG. 2, the work lead splitter 118 is a T-connector having a first work connector 202, a second work connector 204, and a third work connector 206. The first work connector 202 is coupled to a work lead terminal (e.g., the second output terminal 108c) of a welding-type power supply (e.g., the welding-type power supply 102c). The second work connector 204 is coupled to a second work lead terminal (e.g., the second output terminal 108b) of a welding-type power supply (e.g., the welding-type power supply 102b).

The third work connector 206 is coupled to the work clamp 122, which electrically connects both the work connectors 202, 204 (and the output terminals 108b, 108c) to the workpiece 104. In some other examples, a work cable and/or the work clamp 122 are integrated with the work lead splitter 118.

In examples in which three or more welding-type power supplies 102a-102c are concurrently set up, the work lead splitter 118 may include additional connectors to attach to three or more work lead terminals. Additionally or alternatively, multiple work lead splitters 118 may be coupled together to provide additional work connectors for coupling to additional welding-type power supplies 102a-102c.

In some other examples, the work clamp 122 may be provided with multiple connectors and/or cables for separate connection to the output terminals 108a-108c of the welding-type power supplies 102a-102c.

Figure 3:
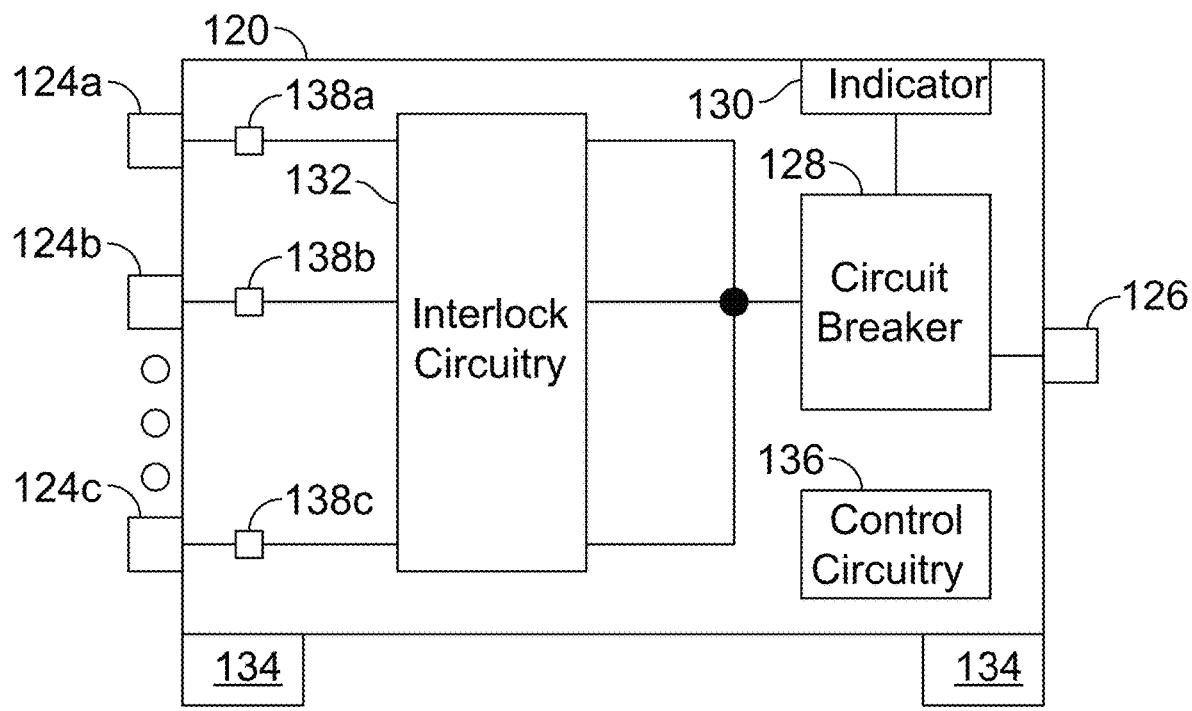
FIG. 3 is a block diagram of an example implementation of the power splitter of FIG. 1.

The power splitter 120 couples respective input power terminals 110a-110c of the welding-type power supplies 102a-102c to the same input power source 112. FIG. 3 is a block diagram of an example implementation of the power splitter 120 of FIG. 1. The example power splitter 120 includes power connectors 124a-124c to be coupled to the input power terminals 110a-110c of the welding-type power supplies 102a-102c. The power splitter 120 further includes an input power connector 126, which is configured to be coupled to the input power source 112. The example power connectors 124a-124c are coupled in parallel.

The example power connectors 124a-124c and/or the input power connector 126 may be configured for a particular input voltage and/or for a range of input voltages. For example, any or all of the power connectors 124a-124c, and/or the input power connector 126, may be implemented as disclosed in U.S. Pat. Nos. 7,422,452 and/or 6,720,527. To this end, any and/or all of the welding-type power supplies 102a-102c may be configured to accept and convert a range of input voltages to the corresponding output power as disclosed in U.S. Pat. No. 6,002,103. The entireties of U.S. Pat. Nos. 7,422,452 and 6,720,527 are incorporated herein by reference.

In some other examples, the power connectors 124a-124c and/or the input power connector 126 may be configured as a particular power connector corresponding to the voltage and/or standard associated with the region in which the power supplies 102a-102c are located.

In some examples, the input power connector 126 may be replaced with, or integrated with, a power cord and power connector for connection to the input power source 112.

As illustrated in FIG. 3, the example power splitter 120 includes a circuit breaker 128 coupled between the input power connector 126 and the power connectors 124a-124c. The circuit breaker 128 may be configured or selected to avoid simultaneous use of multiple power supplies 102a-102c, such as by selecting an input current that is greater than the input current used by a single one of the power supplies 102a-102c, and less than an input current used by two or more of the power supplies 102a-102c. The circuit breaker 128 may be a current-based breaker, a thermal breaker, a fuse, and/or any other type of circuit breaker.

The circuit breaker 128 may be coupled to an indicator 130 (e.g., a light, a buzzer, etc.) which outputs an observable indication in response to a tripping of the circuit breaker 128. The indicator 130 may provide the operator with a clear signal of the cause of sudden stoppages in operation of the power supplies 102a-102c. When the circuit breaker 128 is reset, the indicator 130 may likewise be reset.

Additionally or alternatively, the power splitter 120 may include interlock circuitry 132 which prevents use of one or more of the power supplies 102a-102c when another of the power supplies 102a-102c is already being used to perform a welding-type process (e.g., drawing more than a threshold current). In some examples, the circuit breaker 128 and/or interlock circuitry 132 may provide sufficient power to permit usage of user interfaces of the power supplies 102a-102c, but prevent concurrent output (e.g., immediate shutoff, prevent extended concurrent use, etc.) by multiple ones of the power supplies 102a-102c. For example, when one of the power supplies 102a-102c is outputting welding-type power during a welding-type process (e.g., drawing sufficient current via one of the power connectors 124a-124c to enable output of welding-type power), the interlock circuitry 132 may permit sufficient power to be drawn by the other power connectors 124a-124c to operate the user interfaces (e.g., configure parameters) at the other power supplies 102a-102c, but not permit transmission of power through the other power connectors 124a-124c that would sustain a welding-type process.

In some examples, the power splitter 120 includes one or more output connectors for connection of accessories or other devices which are not connected to the workpiece 104 (e.g., via the work lead splitter 118). In some such examples, the output connectors may be matched to a same voltage and/or voltage range as the input power connector 126 (e.g., 115 VAC, 230 VAC, etc.).

In some examples, the power splitter 120 includes mounting features 134 for attaching the power splitter 120 to a welding cart, welding-type power supply housing, and/or any other structure. For example, the power splitter 120 may include mounting flange(s), mounting feet, and/or any other attachment features.

In some examples, the power splitter 120 may include control circuitry 136 to track usage via each of the example power connectors 124a-124c. For example, the control circuitry may be coupled to current sensors 138a-138c attached to each of the power connectors 124a-124c, and monitor the current output time and/or ampere-hours output to each of the power connectors 124a-124c. The control circuitry may include communication circuitry to communicate the measured usage to an external computing device (e.g., the operator's smartphone, a tablet computer, a personal computer, a laptop computer, a server, a cloud computing service, and/or any other type of computing device), such as via wired or wireless communications.

As used herein, the word "exemplary" means "serving as an example, instance, or illustration." The examples described herein are not limiting, but rather are exemplary only. It should be understood that the described examples are not necessarily to be construed as preferred or advantageous over other examples. Moreover, the terms "examples of the invention," "examples," or "invention" do not require that all examples of the invention include the discussed feature, advantage, or mode of operation.

As utilized herein the terms "circuits" and "circuitry" refer to physical electronic components (i.e. hardware) and any software and/or firmware (code) that may configure the hardware, be executed by the hardware, and/or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y, and/or z" means "one or more of x, y and z". As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

The present devices and/or methods may be realized in hardware, software, or a combination of hardware and software. The present methods and/or systems may be realized in a centralized fashion in at least one computing system, processors, and/or other logic circuits, or in a distributed fashion where different elements are spread across several interconnected computing systems, processors, and/or other logic circuits. Any kind of computing system or other apparatus adapted for carrying out the methods described herein is suited. A typical combination of hardware and software may be a processing system integrated into a welding power source with a program or other code that, when being loaded and executed, controls the welding power source such that it carries out the methods described herein. Another typical implementation may comprise an application specific integrated circuit or chip such as field programmable gate arrays (FPGAs), a programmable logic device (PLD) or complex programmable logic device (CPLD), and/or a system-on-a-chip (SoC). Some implementations may comprise a non-transitory machine-readable (e.g., computer readable) medium (e.g., FLASH memory, optical disk, magnetic storage disk, or the like) having stored thereon one or more lines of code executable by a machine, thereby causing the machine to perform processes as described herein. As used herein, the term "non-transitory machine readable medium" is defined to include all types of machine readable storage media and to exclude propagating signals.

An example control circuit implementation may be a microcontroller, a field programmable logic circuit and/or any other control or logic circuit capable of executing instructions that executes weld control software. The control circuit could also be implemented in analog circuits and/or a combination of digital and analog circuitry.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A system to enable multiple welding-type power supplies to be concurrently set up for operation on a same workpiece, the system comprising:
   a work lead splitter configured to couple respective work lead terminals of the multiple welding-type power supplies to a same work clamp, the work lead splitter comprising a first work connector configured to connect to a first one of the work lead terminals on a first housing of a first one of the multiple welding-type power supplies directly or via a first cable, and a second work connector configured to connect to a second one of the work lead terminals on a second housing of a second one of the multiple welding-type power supplies via a second cable; and
   a power splitter configured to couple respective input power terminals of the multiple welding-type power supplies to a same source of input power.

2. The system as defined in claim 1, wherein the work lead splitter further comprises a third work connector configured to be coupled to the same work clamp, the third work connector being electrically connected to the first work connector and the second work connector.

3. The system as defined in claim 1, wherein the work lead splitter further comprises a work cable and the same work clamp electrically connected to the first work connector and the second work connector.

4. The system as defined in claim 1, wherein the power splitter comprises:
   a first power connector configured to be coupled to a first input power terminal of the first one of the multiple welding-type power supplies; and
   a second power connector configured to be coupled to a second input power terminal of the second one of the multiple welding-type power supplies.

5. The system as defined in claim 4, wherein the power splitter further comprises a third power connector configured to be coupled to an input power cable to receive input power, the third power connector being electrically connected to the first power connector and the second power connector.

6. The system as defined in claim 4, wherein the power splitter further comprises an input power cable configured to be coupled to an input power source, the input power cable being electrically connected to the first power connector and the second power connector.

7. The system as defined in claim 4, wherein the power splitter comprises a circuit breaker configured to disconnect at least one of the first power connector and the second power connector from the same source of input power in response to an input current to the power splitter exceeding a threshold current.

8. A system to enable multiple welding-type power supplies to be concurrently set up for operation on a same workpiece, the system comprising:
   a work lead splitter configured to couple respective work lead terminals of the multiple welding-type power supplies to a same work clamp; and
   a power splitter configured to couple respective input power terminals of the multiple welding-type power supplies to a same source of input power, wherein the power splitter comprises:
   a first power connector configured to be coupled to a first input power terminal of a first one of the multiple welding-type power supplies;
   a second power connector configured to be coupled to a second input power terminal of a second one of the multiple welding-type power supplies;
   a circuit breaker configured to disconnect at least one of the first power connector and the second power connector from the same source of input power in response to an input current to the power splitter exceeding a threshold current; and
   an indicator configured to provide at least one of an audio indication or a visual indication that the circuit breaker has disconnected at least one of the first power connector and the second power connector from the same source of input power.

9. A system to enable multiple welding-type power supplies to be concurrently set up for operation on a same workpiece, the system comprising:
   a work lead splitter configured to couple respective work lead terminals of the multiple welding-type power supplies to a same work clamp; and
   a power splitter configured to couple respective input power terminals of the multiple welding-type power supplies to a same source of input power, wherein the power splitter comprises:
   a first power connector configured to be coupled to a first input power terminal of a first one of the multiple welding-type power supplies;
   a second power connector configured to be coupled to a second input power terminal of a second one of the multiple welding-type power supplies; and
   interlock circuitry configured to prevent transmission of sufficient power to sustain a welding-type process to the second power connector while at least a threshold current is being transmitted via the first power connector.

10. The system as defined in claim 9, wherein the interlock circuitry is configured to permit transmission of sufficient power to enable operation of a user interface of the second one of the multiple welding-type power supplies while at least the threshold current is being transmitted via the first power connector.

11. The system as defined in claim 1, wherein the multiple welding-type power supplies comprise two or more of a welding power supply, a plasma cutting power supply, or a wire preheating power supply.

12. A system to enable multiple welding-type power supplies to be concurrently set up for operation on a same workpiece, the system comprising:
   a work lead splitter configured to couple respective work lead terminals of the multiple welding-type power supplies to a same work clamp; and
   a power splitter configured to couple respective input power terminals of the multiple welding-type power supplies to a same source of input power, wherein the power splitter comprises one or more mounting features configured to physically mount the power splitter to at least one of a cart or one of the multiple welding-type power supplies.

13. A system to enable multiple welding-type power supplies to be concurrently set up for operation on a same workpiece, the system comprising:
   a work lead splitter configured to couple respective work lead terminals of the multiple welding-type power supplies to a same work clamp; and
   a power splitter configured to couple respective input power terminals of the multiple welding-type power supplies to a same source of input power, wherein the power splitter comprises:
      a first power connector configured to be coupled to a first input power terminal of a first one of the multiple welding-type power supplies;
      a second power connector configured to be coupled to a second input power terminal of a second one of the multiple welding-type power supplies;
      current sensors configured to monitor an output via each of the first power connector and the second power connector; and
      control circuitry configured to track usage time for each of the first power connector and the second power connector based on the current sensors.

* * * * *